United States Patent
Iovin et al.

(10) Patent No.: US 7,213,172 B2
(45) Date of Patent: May 1, 2007

(54) DEBUGGING POWER MANAGEMENT

(75) Inventors: Christian Iovin, Federal Way, WA (US); Glenn Cochran, Dupont, WA (US); Keith Jones, Olympia, WA (US); Aafreen Siddiqui, Newcastle, WA (US); Shad Muegge, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 570 days.

(21) Appl. No.: 10/813,267

(22) Filed: Mar. 31, 2004

(65) Prior Publication Data

US 2005/0240816 A1    Oct. 27, 2005

(51) Int. Cl.
*G06F 11/00*    (2006.01)
(52) U.S. Cl. .......................................... 714/36; 714/22
(58) Field of Classification Search .................. 714/36, 714/22
See application file for complete search history.

(56) References Cited

U.S. PATENT DOCUMENTS

| | | | |
|---|---|---|---|
| 5,630,052 A | 5/1997 | Shah | |
| 6,049,879 A * | 4/2000 | Davis et al. | 713/300 |
| 6,772,357 B2 * | 8/2004 | Billick et al. | 713/340 |
| 7,114,098 B2 * | 9/2006 | Hammond et al. | 714/22 |
| 2003/0149911 A1 * | 8/2003 | Hsu | 714/22 |
| 2005/0071719 A1 * | 3/2005 | Faust et al. | 714/741 |
| 2005/0210333 A1 * | 9/2005 | Allue et al. | 714/27 |
| 2006/0195822 A1 * | 8/2006 | Beardslee et al. | 717/124 |

* cited by examiner

*Primary Examiner*—Bryce P. Bonzo
(74) *Attorney, Agent, or Firm*—Venable, LLP; James R. Burdett

(57) ABSTRACT

Debugging a device, including a device having power-saving features, may include observing and controlling power state transitions.

24 Claims, 11 Drawing Sheets

| PIN NUMBER | HOST PIN NAME | HOST PIN DESCRIPTION | JTAG/TAP? (Y/N) |
|---|---|---|---|
| 1 | GND | GROUND | N |
| 2 | GND | GROUND | N |
| 3 | GEN I/O | DATA TRANSMISSION | N |
| 4 | DEBUG | DEBUG | N |
| 5 | GEN I/O | DATA TRANSMISSION | N |
| 6 | DEBUG | DEBUG | N |
| 7 | GEN I/O | DATA TRANSMISSION | N |
| 8 | GND | GROUND | N |
| 9 | GEN I/O | DATA TRANSMISSION | N |
| 10 | TDI | TEST DATA IN | Y |
| 11 | GEN I/O | DATA TRANSMISSION | N |
| 12 | TMS | TEST MODE SELECT | Y |
| 13 | GEN I/O | DATA TRANSMISSION | N |
| 14 | TRSTn | TEST LOGIC RESET | Y |
| 15 | RESETn | RESET | N |
| 16 | TCK | TEST CLOCK | Y |
| 17 | DEBUG | DEBUG | N |
| 18 | DEBUG | DEBUG | N |
| 19 | BCLKp | BUS CLOCK | N |
| 20 | GND | GROUND | N |
| 21 | BCLKn | BUS CLOCK | N |
| 22 | PWR | POWER | N |
| 23 | GEN I/O | DRIVES GEN I/O | N |
| 24 | TDO | TEST DATA OUT | Y |
| 25 | GND | GROUND | N |
| 26 | PULLED PIN | PULLED PIN | N |

FIG. 12

| PIN NUMBER | HOST PIN NAME | TARGET PIN NAME | TARGET PIN DESCRIPTION |
|---|---|---|---|
| 1 | GND | GND | GROUND |
| 2 | GND | GND | GROUND |
| 3 | GEN I/O | SLP# | SLEEP STATE |
| 4 | DEBUG | SYSTEM ERROR | SYSTEM ERROR |
| 5 | GEN I/O | STPCLK# | STOP CLOCK |
| 6 | DEBUG | SYSTEM RESET | SYSTEM RESET |
| 7 | GEN I/O | GEN I/O | DATA TRANSMISSION |
| 8 | GND | GND | GROUND |
| 9 | GEN I/O | GEN I/O | DATA TRANSMISSION |
| 10 | TDI | TDI | TEST DATA IN |
| 11 | GEN I/O | GEN I/O | DATA TRANSMISSION |
| 12 | TMS | TMS | TEST MODE SELECT |
| 13 | GEN I/O | GEN I/O | DATA TRANSMISSION |
| 14 | TRSTn | TRST# | TEST RESET |
| 15 | RESETn | RESET# | RESET |
| 16 | TCK | TCK | TEST CLOCK |
| 17 | DEBUG | TCK | TEST CLOCK |
| 18 | DEBUG | | |
| 19 | BCLKp | BCLK0 | BUS CLOCK |
| 20 | GND | GND | GROUND |
| 21 | BCLKn | BCLK1 | BUS CLOCK |
| 22 | PWR | PWR | POWER |
| 23 | GEN I/O DR | GEN I/O DR | DRIVES GEN I/O |
| 24 | TDO | TDO | TEST DATA OUT |
| 25 | GND | GND | GROUND |
| 26 | PULLED PIN | PULLED PIN | GROUND |

DEBUGGING POWER MANAGEMENT

BACKGROUND OF THE INVENTION

Validation groups that debug processors and chipsets face many challenges today. For example, an increasing emphasis on personal computer (PC) power management consumption has caused validation groups to debug processors and chipsets in the face of different power management schemes. Some of the processors and chipsets may contain explicit debug support in the silicon to enable debuggers to control asynchronous events, such as, e.g., power management transitions. Other processors and chipsets, however, may not contain the requisite debug support, and thus debuggers may not be able to control such asynchronous events, for example.

An In-Target Probe (ITP) is a software and hardware debug tool that may be used by validation and debug groups for processor and chipset validation. An ITP may enable a debugger to observe and control the execution of a program for debugging hardware and software, for example. The ITP may be used, for example, to validate a new microprocessor and to isolate system, compatibility and software problems. The ITP may plug into the Debug Port of what is known as a target system and provide control of that system. The ITP may also provide a graphical user interface, Joint Test Action Group (JTAG)/Debug Port access to the processor or chipset's debug features, full interrogation and control of the processor, access to the registers, memory, and Test Access Port (TAP), among several other CPU units.

If the processor or chipset does not contain explicit built-in debug support, the debugger, via the ITP, may not be able to reach a debug mode to conduct proper validation. As a result, debugging may become more problematic in the face of different power management schemes because the inability to transition between power management modes may cause the ITP to become ineffective.

Even if the processor or chipset does contain explicit built-in debug support, the debugger, via the ITP, may need to control asynchronous transitions between power management modes to prevent the transmission of invalid data, for example, from a target system to a host system.

BRIEF DESCRIPTION OF THE DRAWINGS

Various exemplary features and advantages of embodiments of the invention will be apparent from the following, more particular description of exemplary embodiments of the present invention, as illustrated in the accompanying drawings wherein like reference numbers generally indicate identical, functionally similar, and/or structurally similar elements.

FIG. 12 depicts a table that illustrates an exemplary embodiment of the present invention; and FIG. 13 depicts a table that illustrates an exemplary embodiment of the present invention.

DETAILED DESCRIPTION OF EXEMPLARY EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations may be used without parting from the spirit and scope of the invention.

Embodiments of the present invention may provide a system and/or method for debugging systems with power-saving features. Power-saving features may include, for example, power management transition features. A power management transition or power state transition, as referred to herein, may be any state transition in a device, such as a silicon device or the like, that alters the amount of instruction execution of physical attributes or instruction execution to expressly minimize or maximize power utilization. For example, power management transitions may be frequency transitions and/or voltage transitions that cause a processor to transition between power management states. Additionally, the power management states may be dynamic and/or asynchronous transitions. As would be understood by a person having ordinary skill in the art, power management states may be CPU sleep states as identified in the Advanced Configuration and Power Interface (ACPI) specification, for example.

Further, as will be understood by a person having ordinary skill in the art, a so-called In-Target Probe (ITP) may be a software and/or hardware debug tool that may help a debugger/user observe and/or control the step-by-step execution of a program for debugging hardware and software, for example. As referred to in this application, debugging may include, for example, finding a hardware and/or software error and identifying the location and cause of the error so that it may be corrected. When a debugger (user) is, for example, observing and controlling the step-by-step execution of a program for debugging, the debugger may be said to be in debug mode. Debug mode may also be referred to as any interrogation mode for a device, such as a processor or a chipset, that may pause execution of the device and allow elements of the internal state of the device to be visible for debugging, for example, by using "HALT" and "GO" commands. As will be understood by a person having ordinary skill in the art, a break event, such as a user-initiated "HALT" command, for example, may be any event that signals the device, for example, to go into debug mode.

Figure 1:
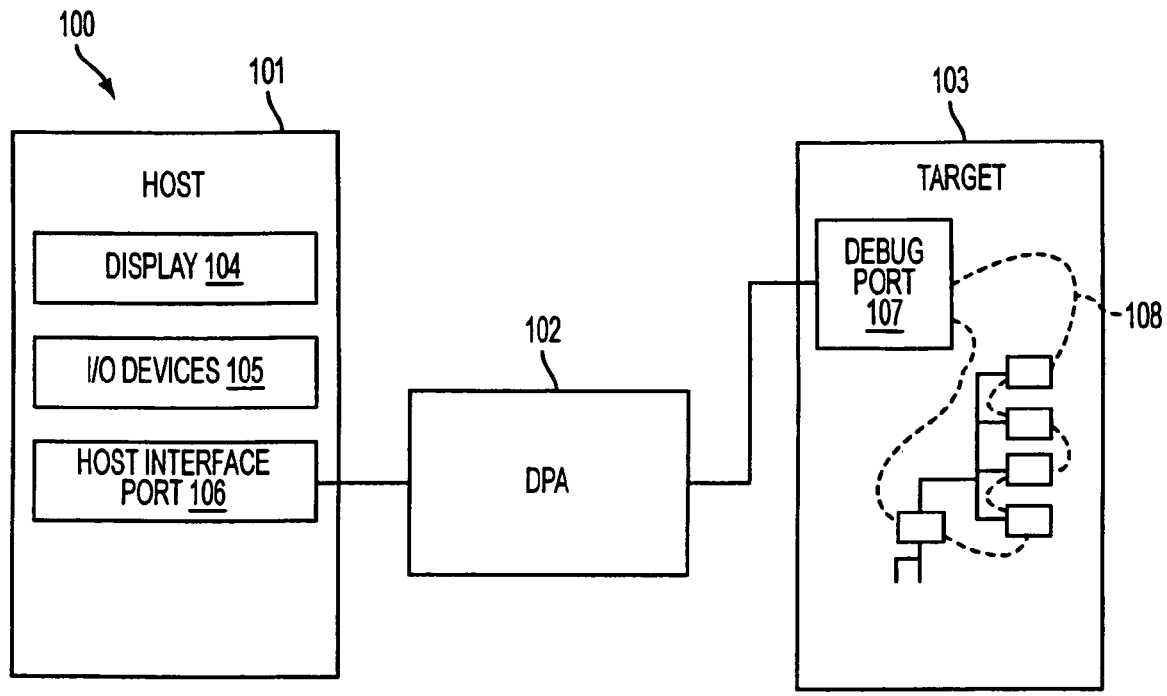
FIG. 1 depicts an exemplary embodiment of a system according to an exemplary embodiment of the invention.

Referring now to the drawings, FIG. 1 depicts an exemplary system 100 for implementing a debug tool according to an exemplary embodiment of the present invention. System 100 may include a host 101, a debug port adapter (DPA) 102, and a target 103. In an exemplary embodiment of the invention, host 101 may be any computer for supplying ITP hardware and/or software for enabling a debug mode, for example. Host 101 may enable a debugger to observe and control the step-by-step execution of a program for debugging.

In an exemplary embodiment of the invention, host 101 may include a display 104 for displaying a debugging software program, such as, for example. Windows 2000™ Source Level Debugger from Microsoft® of Redmond, Wash., U.S.A. As will be understood by a person having ordinary skill in the art, a graphical user interface (GUI) may be included with the debugging software program, through which a debugger may observe and control the step-by-step execution of a program for debugging. Additionally, as will be understood by a person having ordinary skill in the art, host 101 may include other input/output (I/O) devices 105, such as a keyboard, a mouse, or the like, that may further enable a debugger to observe and control the step-by-step execution of a program for debugging.

In an exemplary embodiment of the invention, as would be understood by a person having ordinary skill in the art, host 101 may contain a host interface port 106 to connect host 101 to DPA 102. In an exemplary embodiment of the invention, host interface port 106 may be a standard interface port, such as, for example, a universal serial bus (USB) port, or the like. In a further exemplary embodiment of the invention, host interface port 106 may be a specific interface port, such as, for example, a peripheral component interconnect (PCI) card that may act as a debug port interface (DPI) between host 101 and DPA 102.

In an exemplary embodiment of the invention, DPA 102 may act as a buffer board between host 101 and target 103. For a more detailed discussion of DPA 102, please refer to discussion below regarding FIG. 2.

As shown in FIG. 1, target 103 may include a debug port 107 and a debug mode interface 108. In an exemplary embodiment of the invention, target 103 may be the debug platform containing the processor or chipset, for example. In an exemplary embodiment of the invention, target 103 may have explicit debug support built-in. In such an embodiment, an ITP may be able to debug during power state transitions, for example. In a further exemplary embodiment of the invention, target 103 may not have explicit built-in debug support, but may have a built-in debug mode interface 108 present. In such an embodiment, an ITP, for example, may not be able to enter a debug mode based on transitions between power management modes.

Debug port 107 may connect target 103 to DPA 102. As will be understood by a person having ordinary skill in the art, such a connection may enable logic signals, for example, to be transmitted from target 103 to host 101, via DPA 102, for example.

Figure 2:
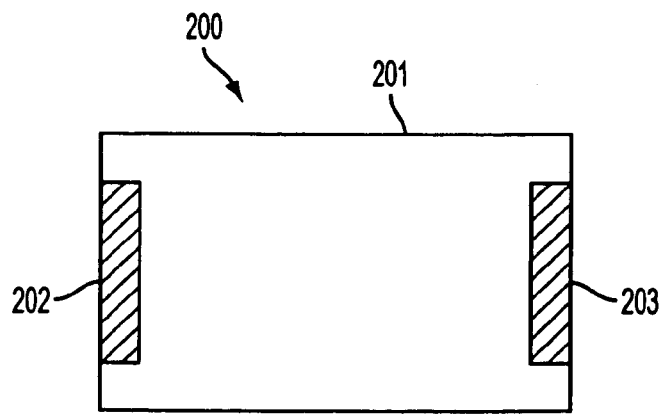
FIG. 2 depicts an exemplary embodiment of a system according to an exemplary embodiment of the invention.

FIG. 2 depicts an exemplary embodiment of a DPA 200, according to an exemplary embodiment of the invention. As shown in FIG. 2, DPA 200 may include a buffer board 201, a host interface connector 202, and a debug port connector 203. In an exemplary embodiment of the invention, DPA 200 may translate the logic signals transmitted from the target system into pin assertions, for example, to be interpreted by the host system and logic signals transmitted from the host system into pin assertions to be interpreted by the target system. In an exemplary embodiment of the invention, DPA 200 may also, for example, drive JTAG scans to access and control test access port (TAP) logic that may be included on the target 103. In a further embodiment of the invention, DPA 200 may be used to drive general purpose input/output (I/O) signals into the target system at a voltage appropriate for the target system, as will be discussed in detail further below.

In an exemplary embodiment of the invention, DPA 200 may connect to host 101, for example, via a connector (not shown) that may be plugged into host interface connector 202. Similarly, debug port connector 203 may connect to a debug port, such as, for example, debug port 107, on a target system, for example.

In an exemplary embodiment of the invention, debug port connector 203 may contain any number of male or female leads, commonly referred to as pins, to transmit signals between a host system and a target system. For example, in an exemplary embodiment of the invention, debug port connector 203 may contain anywhere from 12–48 pins.

Figure 3:
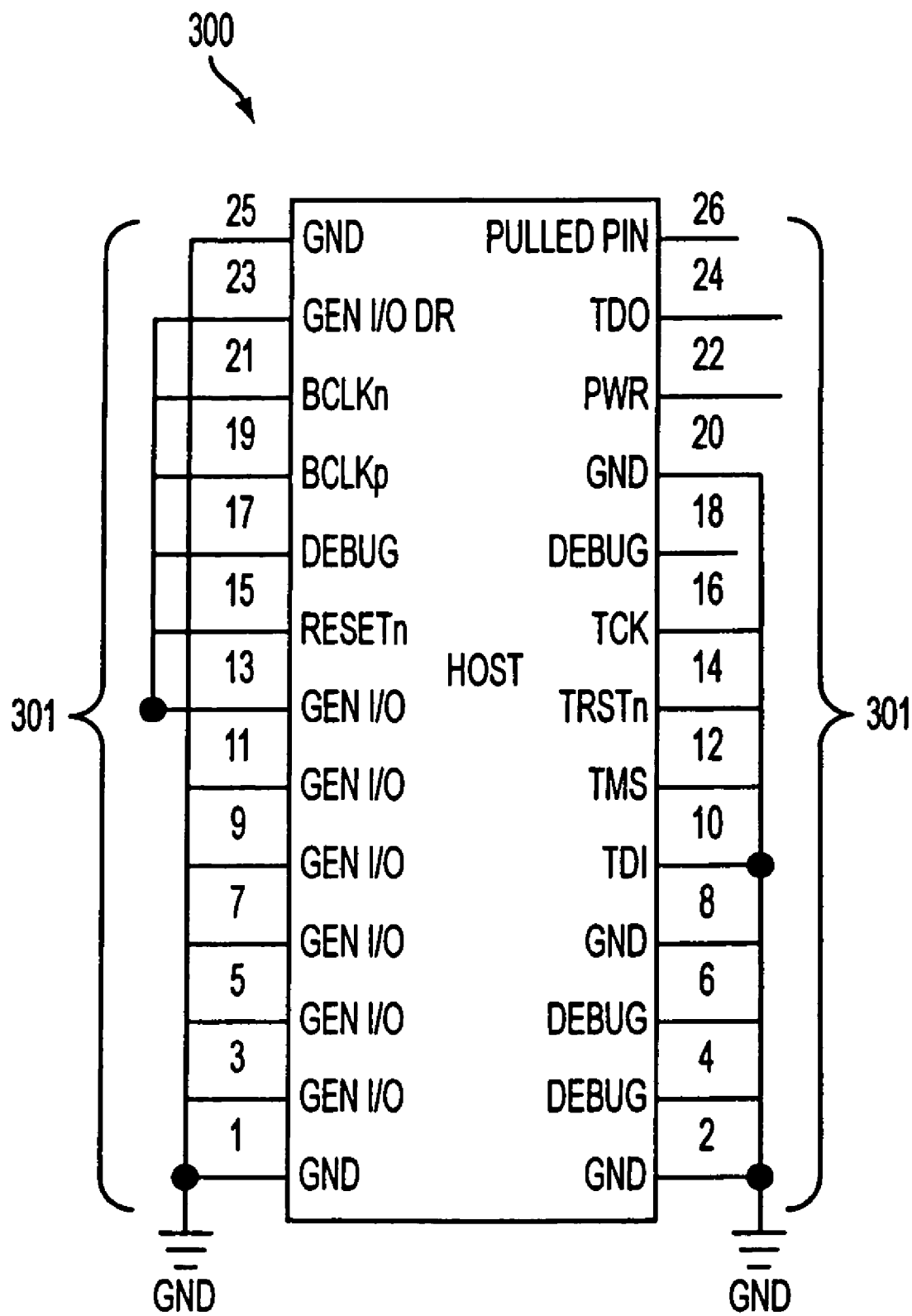
FIG. 3 depicts an exemplary embodiment of a system according to an exemplary embodiment of the invention.

FIG. 3 depicts an exemplary embodiment of a connector 300 for connecting a DPA to a target system according to an exemplary embodiment of the invention. Connector 300 may contain host pins 301 that may enable the transmission of signals between a host system and a target system. In an exemplary embodiment of the invention, host pins 301 may be assigned as is illustrated in FIG. 3 and FIG. 12. FIG. 12 depicts a table that illustrates how host pins 301 may be assigned in an exemplary embodiment of the invention.

As can be seen in FIGS. 3 and 12, several of the host pins 301 may be pins that provide a debugger with access to the TAP via a JTAG scan method. Other pins may provide the debugger with access to other pins on a target device.

As can also be seen in FIG. 3 and the table in FIG. 12, connector 300 may also contain what may be referred to as general purpose I/O pins (GEN I/O). In an exemplary embodiment of the invention, a general purpose I/O pin may be assigned to pin numbers 3, 5, 7, 9, 11, and 13, for example. As will be understood by a person having ordinary skill in the art, the general purpose I/O pins may enable functionality to transmit data between a host system and a target system. In an exemplary embodiment of the invention, as will be described in further detail below, general purpose I/O pins may be overloaded because they are not being used as originally intended. In an exemplary embodiment of the invention, as will be understood by a person having ordinary skill in the art, the general purpose I/O pins may be pulseable pins. That is, when the pins are asserted, they may not be held at a certain level for a predetermined period of time. Instead, when the pin is driven, it may be quickly let go.

In an exemplary embodiment of the invention, one of the general purpose I/O pins may be overloaded and designated as a "debug mode ready" pin that may indicate to the host system that the target system is in debug mode, for example. Another general purpose I/O pin, which may be driven by the GEN I/O DR pin, may be overloaded and designated as a "debug mode request" pin that may indicate to the target system that the host system would like to enter debug mode, for example. In such an embodiment, other general purpose I/O pins may not be used as general purpose I/O pins, but may be overloaded and used to observe other processor signals and power state transitions and react to those signals by sending the target system into debug mode once a desired power management state transition has occurred and/or the desired power management state is reached.

Figure 4:
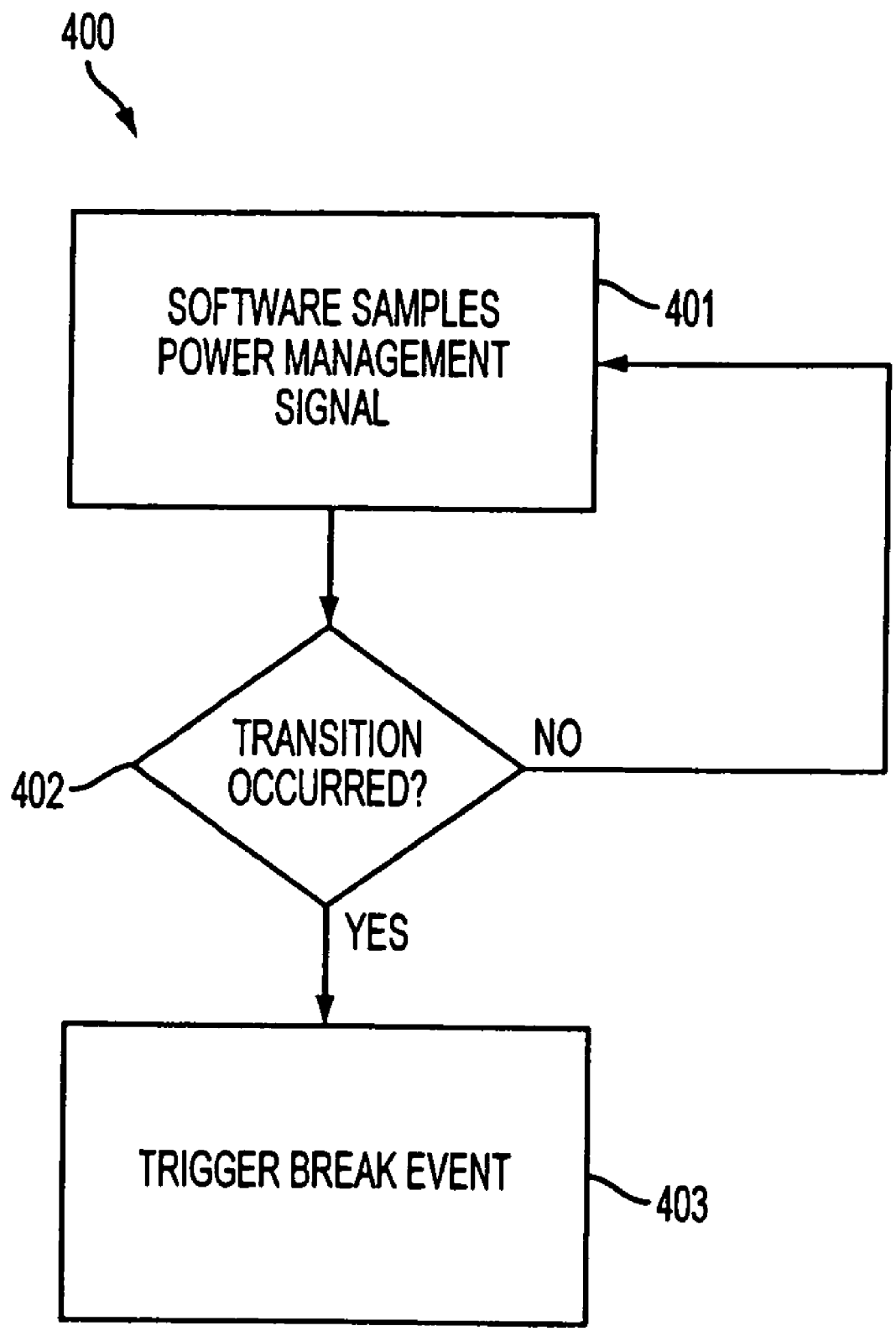
FIG. 4 depicts an exemplary embodiment of a method according to an exemplary embodiment of the invention.

FIG. 4 depicts a flow chart 400, which illustrates an exemplary method for debugging target systems with power-saving features that do not have explicit built-in debug support. In block 401, debugging software may sample power management signals on the target system. In an exemplary embodiment of the invention, to sample the power management signals of the target system, any of the target system's power management pins that are not normally part of the JTAG scan chain may be routed to the debug port for observability of transitions and triggering of a debug mode. As will be understood by a person having ordinary skill in the art, a JTAG scan chain may enable access to the TAP of a target device.

In block 402, the debugging software may determine whether a sleep state transition has occurred. For example, as will be understood by a person having ordinary skill in the art, if a system sleep pin (e.g., SLP#) is asserted, the target system will transition to a lower power state. In block 402, the debugging software may determine if the target system has entered a sleep state within which the debugging software may enter a debug mode.

If a transition has occurred, in block 403, the debugging system may trigger a break event to enter a debug mode. In some exemplary embodiments of the invention, this trigger may be a direct break event request, or an indirect request of another transaction that results in a break event as a side effect. In a further exemplary embodiment of the invention, the trigger may be a break event intended to be used as a sleep state transition break event or overloaded onto another mechanism not used with sleep states. The trigger may also be via a JTAG command, via bus transaction, via physical pin level change (assert/de-assert/pulse/etc.), for example.

Figure 5:
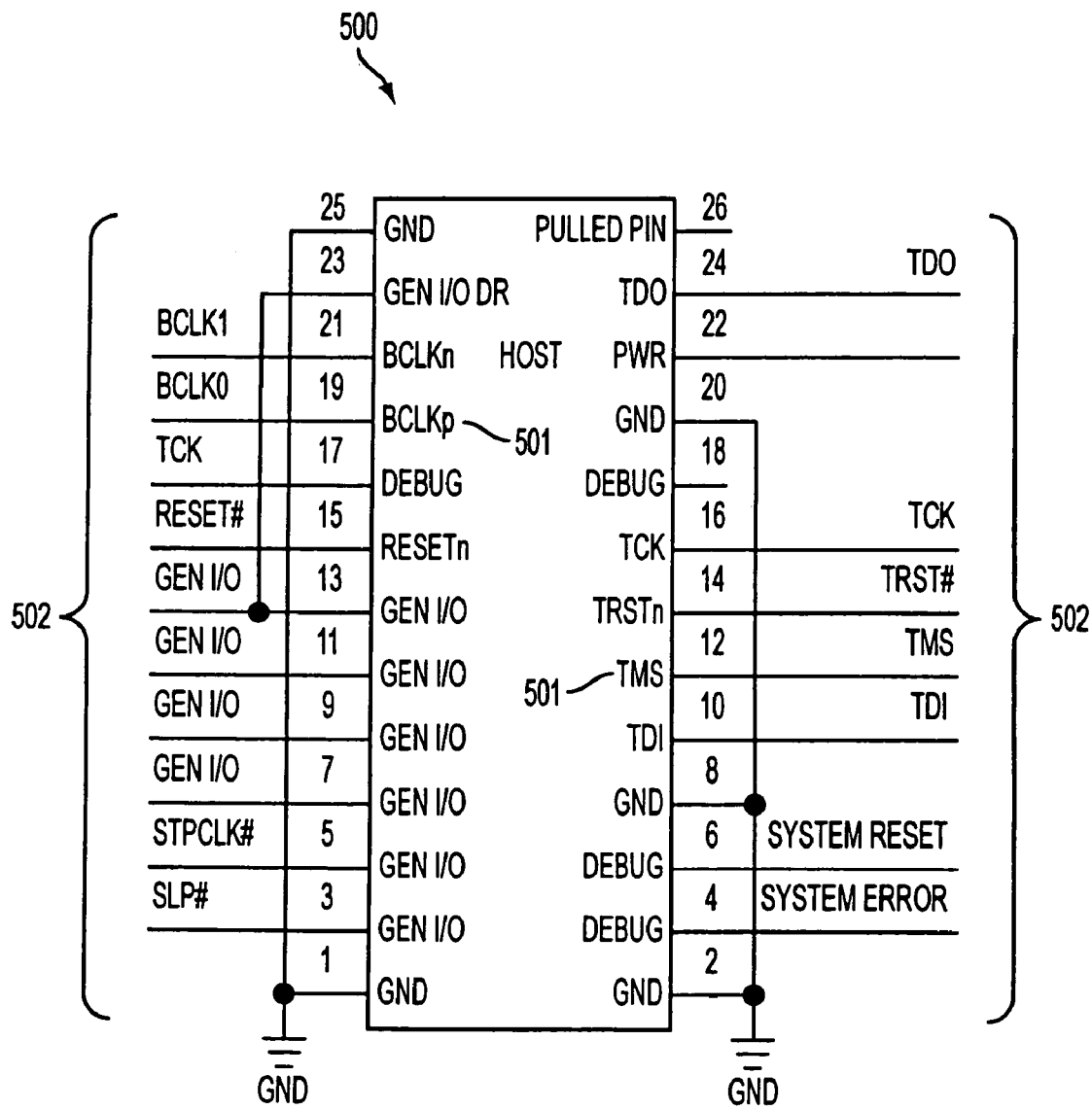
FIG. 5 depicts an exemplary embodiment of a system according to an exemplary embodiment of the invention.

As discussed above, to sample the power management signals of the target system, any of the target system's power management pins that are not normally part of the JTAG scan chain may be routed to the debug port for observability of transitions and triggering of a debug mode. FIG. 5 depicts an exemplary embodiment of platform 500 for connecting a debug port connector to a debug port so that any of the target system's power management pins that are not normally part of the JTAG scan chain may be routed to the debug port for observability of transitions and triggering of a debug mode. Platform 500 may include host pins 501 and target pins 502. As will be understood by a person having ordinary skill in the art, in an exemplary embodiment of the invention, host pins 501 may be coupled to complementary target pins 502 at a debug port to connect a host system to a target system, via a DPA, for example. In an exemplary embodiment of the invention, host pins 501 may be physically located on a debug port connector, such as, debug port connector 203, and target pins 502 may be physically located on a debug port, such as, debug port 107. In an exemplary embodiment of the invention, host pins 501 may be assigned to target pins 502 as is illustrated in FIG. 5 and FIG. 13. FIG. 13 depicts a table that illustrates how host pins 501 may be assigned to target pins 502 in an exemplary embodiment of the invention.

As can be seen from FIGS. 5 and 13, SLP# may be connected to a general purpose I/O pin with rework, for example. As will be understood by a person having ordinary skill in the art, rework may be referred to as blue-wiring, or adding components, wires, and/or connections to a board, post-fabrication. In an exemplary embodiment of the invention, as is shown in FIGS. 5 and 13, STPCLK# may be blue-wired, for example, to another general purpose I/O pin. As will be understood by a person having ordinary skill in the art, the SLP# and STPCLK# pins may indicate different sleep modes. For example, the SLP# pin may indicate that the system is in a given sleep state with clocks running. The STPCLK# pin may indicate that clocks have been turned off.

As will be understood by a person having ordinary skill in the art, in an exemplary embodiment of the invention, a debug pin may be OR-ed with a system error pin or a wake up signal, for example, and the resulting signal may be driven on a system error pin with an open-drain driver to wake up the target system. This signal may be an output signal to the chipset (i.e., the target system) to cause a sleep state transition (i.e., wake the target system up), for example.

Figure 6:
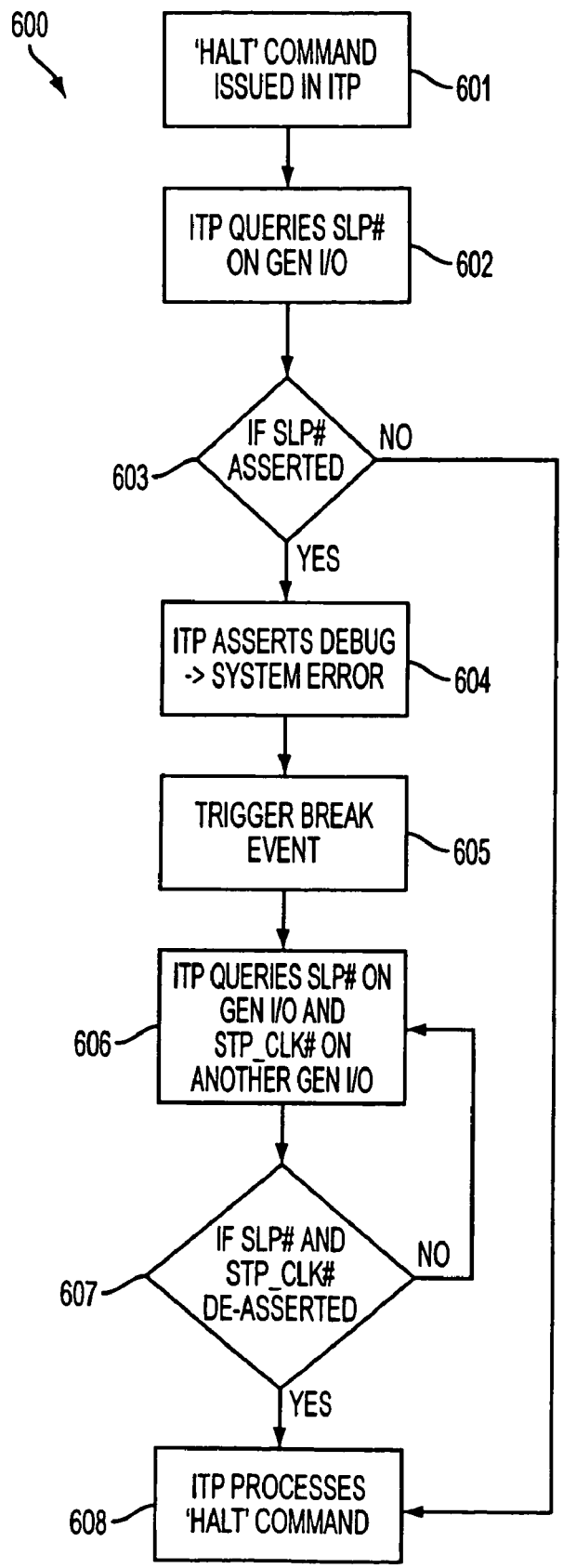
FIG. 6 depicts an exemplary embodiment of a method according to an exemplary embodiment of the invention.

To debug a target system, as described above in connection with FIG. 5, a debugger may have to pause execution of the target system and allow elements of the internal state of the target system to be visible for debugging, for example. FIG. 6 depicts a flow chart 600, which illustrates an exemplary method for pausing a target system with power-saving features that does not have explicit built-in debug support.

In block 601, as will be understood by a person having ordinary skill in the art, a "HALT" command may be issued by a debugger. This "HALT" command may be processed by debugging software and/or an ITP to pause the target system.

In block 602, an ITP may query the SLP# pin that has been reworked to a general purpose I/O pin, for example, as is described above with respect to FIG. 5 and the table in FIG. 13. In block 602, for example, if the processor is in a C3/C4 sleep state, for example, and a 'HALT' command is issued in ITP, the ITP may query the SLP# pin.

In block 603, if SLP# is asserted, the ITP may assert a debug pin which is tied to a system error signal (see FIG. 5 and Table 2) to wake up the target system, for example, in block 604.

If the SLP# pin is asserted in block 603, ITP may trigger a break event in block 605 as is described above with respect to FIG. 4.

In block 606, the ITP may then query the STPCLK# pin until it is de-asserted to make sure a phase-locked loop (PLL) is re-locked and the target's clock compensators have gone out of sleep state, for example. The ITP also queries the SLP# pin to make sure it has been de-asserted.

In an exemplary embodiment of the invention, in block 607 the ITP may continually repeat the query in block 606 until the STPCLK# pin has been de-asserted, for example. Once the STPCLK# pin has been de-asserted, in block 607, the ITP may then process the 'HALT' command to enter a debug mode in block 608.

Referring back to block 603, as is shown in FIG. 6, if the SLP# pin is not asserted, the ITP may process the "HALT" command immediately in block 608 to enter a debug mode.

In a further exemplary embodiment of the invention, explicit built-in debug support may be present in the target system. In such an embodiment of the invention, a debugger may need to control the power-saving features of a target system, for example, to prevent the transmission of invalid data from the target system to a host system.

As will be understood by a person having ordinary skill in the art, a processor may have registers. As referred to herein, a register may be a storage unit that is capable of holding a collection of bits. In an exemplary embodiment of the invention, explicit built-in debug support in the target system may be in the form of registers. In such an embodiment, to control the power-saving features of a target system, the system may include, a defer register and a powerstate register. The defer register may be a multi-bit register, for example, that may enable a debug tool to defer frequency transitions while the debug tool interacts with the target system, for example. The powerstate register may be a multi-bit register that may allow a debug tool to detect the occurrence of frequency transitions to invalidate data, for example.

In an exemplary embodiment of the invention, a target system may have a test access port (TAP) and a core, for example. As will be understood by a person having ordinary skill in the art, a TAP may be circuitry built into the target system to assist in the test, maintenance, and support of the target system. An exemplary TAP may include debug mode interface 108, as is shown in FIG. 1. In an exemplary embodiment of the invention, the TAP may include the above-mentioned defer and powerstate registers. A debugger may use a debug tool, such as an ITP, for example, to perform JTAG scans on the target system to observe and control the functionality of the target system. A JTAG scan may be a single instruction register/data register (IR/DR) scan to the TAP or a plurality of IR/DR scans.

In an exemplary embodiment of the invention, these JTAG scans may be guarded when power-saving features are enabled on the target system. By guarding the JTAG scans, the data integrity of the debug tool may be ensured. To guard JTAG scans, a TAP instruction may be provided, for example, to defer power state transitions during JTAG scans to prevent data corruption.

To defer power state transitions, bits in a defer register may be manipulated, for example. In an exemplary embodiment of the invention, a defer register may contain two bits. The first bit, which may be referred to as the DEFER_DIRECT bit, may unconditionally defer power state transitions. The second bit, which may be referred to as the DEFER_BP bit may defer power state transitions after a breakpoint occurs, for example.

In an exemplary embodiment of the invention, a defer value may be set by the debugger to handle any one of four exemplary cases for deferring power state transitions. For example, a defer value of zero may permit power state transitions; a defer value of one may always defer power state transitions; a defer value of two may defer power state transitions only when the target system is in debug mode; and a defer value of 3 may defer power state transitions after a breakpoint occurs. Based on the value assigned, bits in the defer register may be manipulated to properly defer power state transitions.

Figure 7:
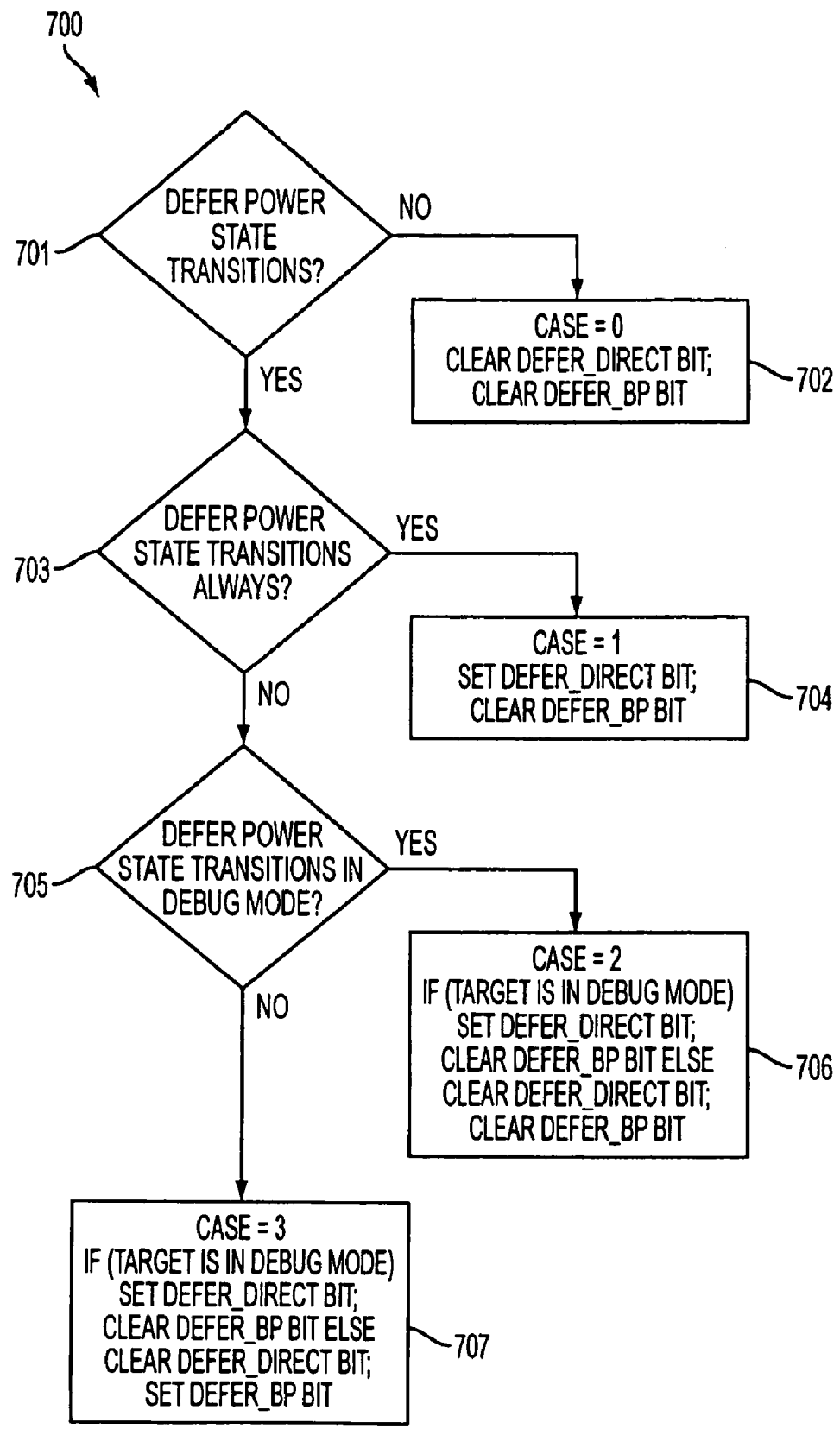
FIG. 7 depicts an exemplary embodiment of a method according to an exemplary embodiment of the invention.

FIG. 7 depicts flow chart 700, which illustrates an exemplary method for deferring power state transitions according to the four exemplary cases described above.

In block 701, a debug tool may determine whether power state transitions are to be deferred. If not, in block 702, the debug tool may clear both the DEFER_DIRECT and DEFER_BP bits.

If power state transitions are to be deferred, in block 703, a debug tool may determine whether power state transitions are to always be deferred. If power state transitions are to always be deferred, the debug tool may set the DEFER_DIRECT bit and clear the DEFER_BP bit in block 704.

If power state transitions are not always to be deferred, in block 705, a debug tool may determine whether power state transitions are to be deferred during debug mode. If power state transitions are to be deferred during debug mode, in block 706, if the target is in debug mode, the debug tool may set the DEFER_DIRECT bit and clear the DEFER_BP bit. If the target is not in debug mode, the debug tool may clear both the DEFER_DIRECT and DEFER_BP bits.

If power state transitions are not always deferred or deferred during debug mode, power state transitions may be deferred after a break point, in block 707. To defer power state transitions after a break point, if the target is in debug mode, the debug tool may set the DEFER_DIRECT bit and clear the DEFER_BP bit. If the target is not in debug mode, the debug tool may clear the DEFER_DIRECT and set the DEFER_BP bits.

Figure 8:
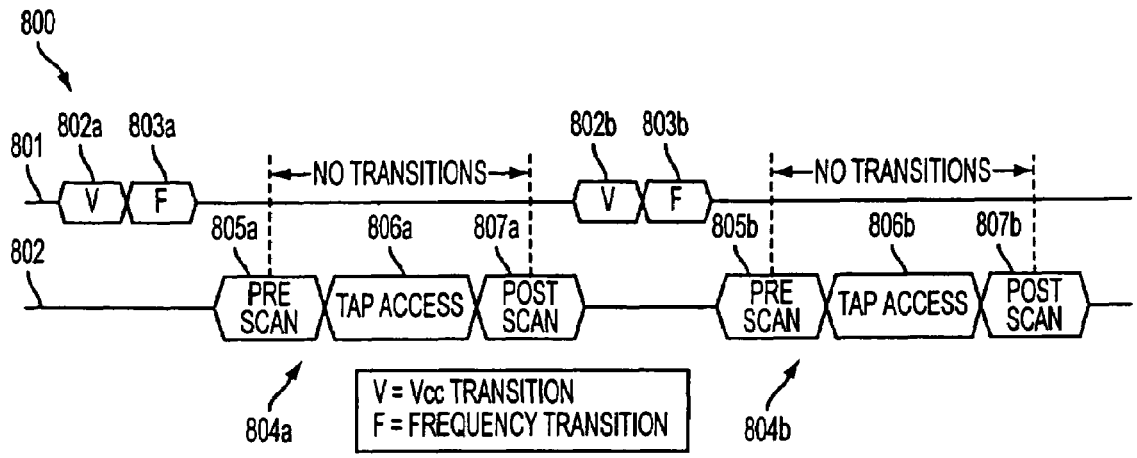
FIG. 8 depicts an exemplary embodiment of a method according to an exemplary embodiment of the invention.

As mentioned above, JTAG scans may be guarded when power-saving features are enabled on the target system. FIG. 8 depicts an exemplary embodiment of a debug sequence 800 for guarding JTAG scans. FIG. 8 shows a sequence of power state transitions 801 that include voltage transitions 802a, 802b and frequency transitions 803a, 803b and a sequence of wrapped JTAG scans 804a, 804b that include PRE scans 805a, 805b, JTAG scans 806a, 806b, and POST scans 807a, 807b.

In an exemplary embodiment of the invention, a debug tool, such as an ITP, for example, may attach PRE scans 805a, 805b and POST scans 807a, 807b to each JTAG scan 806a, 806b, as is shown in FIG. 8 to guard JTAG scans for potential data corruption. In an exemplary embodiment of the invention, the PRE scans 805a, 805b, may use the defer method discussed above to defer power state transitions momentarily until the JTAG scan 806a, 806b completes safely without interruption. The POST scan may detect whether the PRE scan failed and a power state transition occurred during the JTAG scan resulting in invalid data. In an exemplary embodiment of the invention, when such an event occurs, the debug tool may report a corresponding message to the debugger, for example. The POST scan may then use defer condition zero (as described above) to reset the power state transitions.

Figure 9:
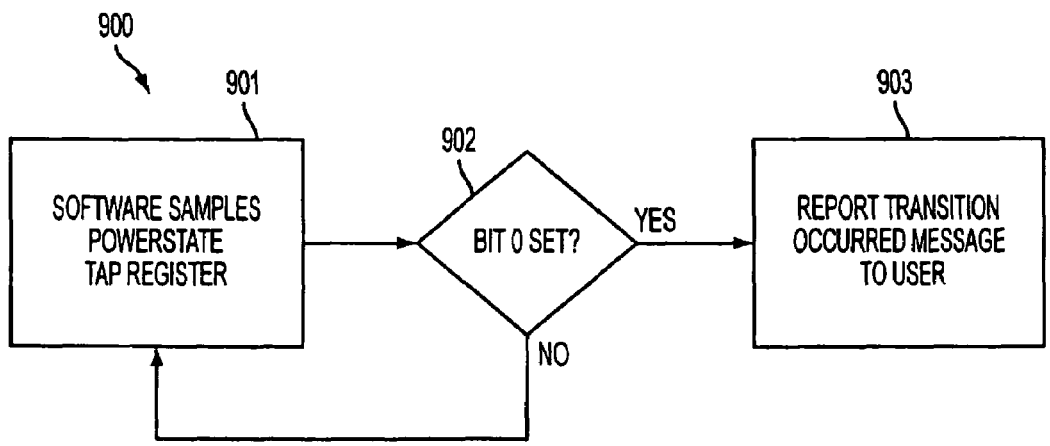
FIG. 9 depicts an exemplary embodiment of a method according to an exemplary embodiment of the invention.

As mentioned above, the POST scan may detect whether the PRE scan failed. FIG. 9 depicts flow chart 900, which illustrates an exemplary method for determining whether a power state transition occurred. In block 901, the debug tool may sample the powerstate register. In block 902, the debug tool may determine whether a bit, such as bit zero, within the powerstate register is set. If the bit is not set, the debug tool may continue to sample the power state register. If the bit is set, in block 903, the debug tool may report the power state transition to the debugger.

In an exemplary embodiment of the invention, to report the power state to the debugger, the debug tool may generate a message to be displayed by the host system, for example, to indicate that a power state transition occurred. In an exemplary embodiment of the invention, to prevent cluttering on the display, the debug tool may report a message for the first power state transition and increment a counter for subsequent transitions to indicate how many transitions occurred since the first transition. The value of this counter may be kept in a user-accessible variable that is stored in a TAP register, for example.

Figure 10:
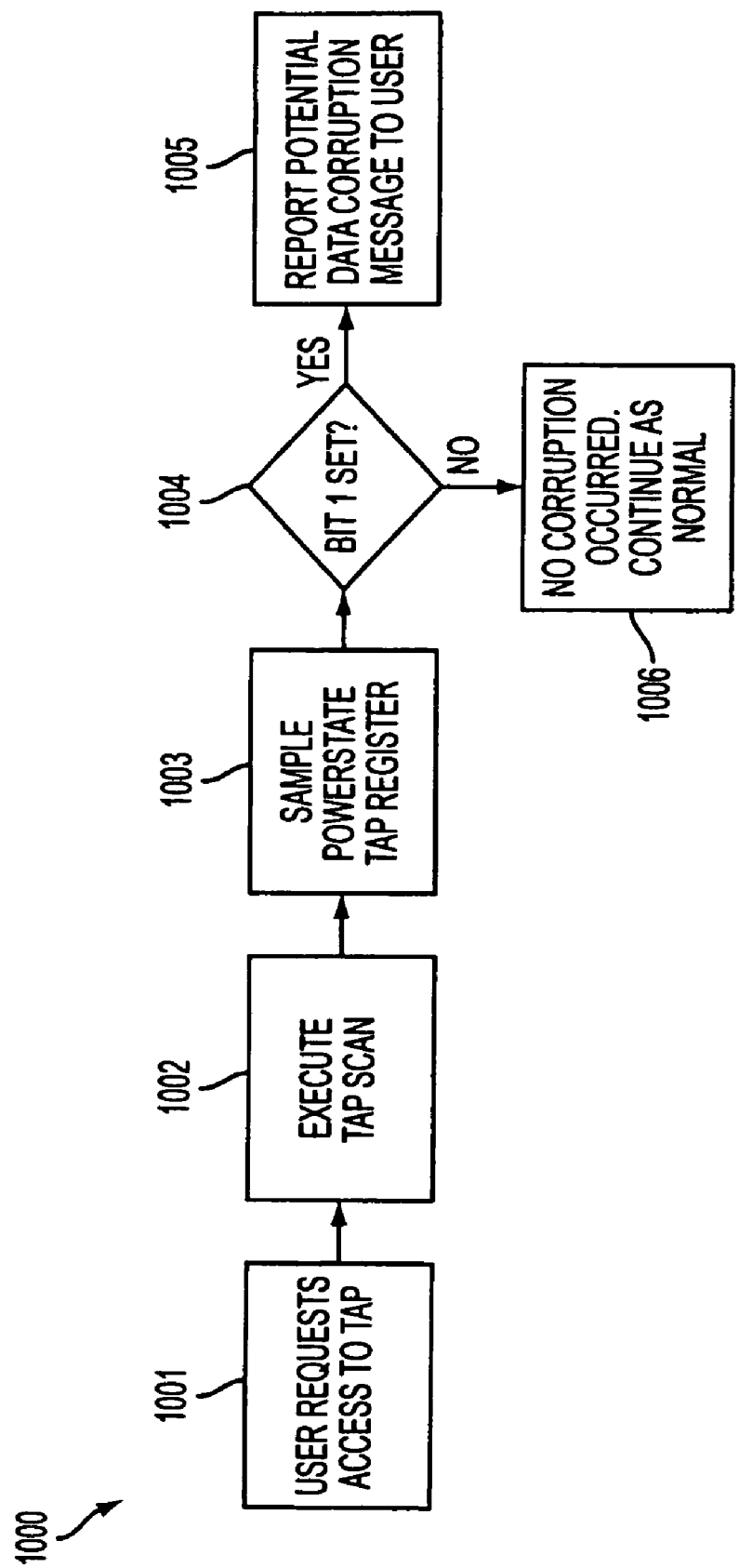
FIG. 10 depicts an exemplary embodiment of a method according to an exemplary embodiment of the invention.

In an exemplary embodiment of the invention, all JTAG scans may be checked for potential to detect and report data corruption when power state transitions occur while a JTAG scan occurs. FIG. 10 depicts flow chart 1000, which illustrates an exemplary method for determining whether a power state transition occurred during a JTAG scan.

In block 1001, a user (i.e., a debugger) may request access to the port. In block 1002, a debug tool, such as an ITP, for example, may execute a JTAG scan. In block 1003, the debug tool may sample the powerstate register. In block 1004, the debug tool may determine whether a bit, such as, bit one, within the powerstate register is set. If the bit is set, the debug tool may report a potential data corruption message to the user in block 1005. If the bit is not set, the debug tool may continue processing the JTAG scan in block 1006.

Figure 11:
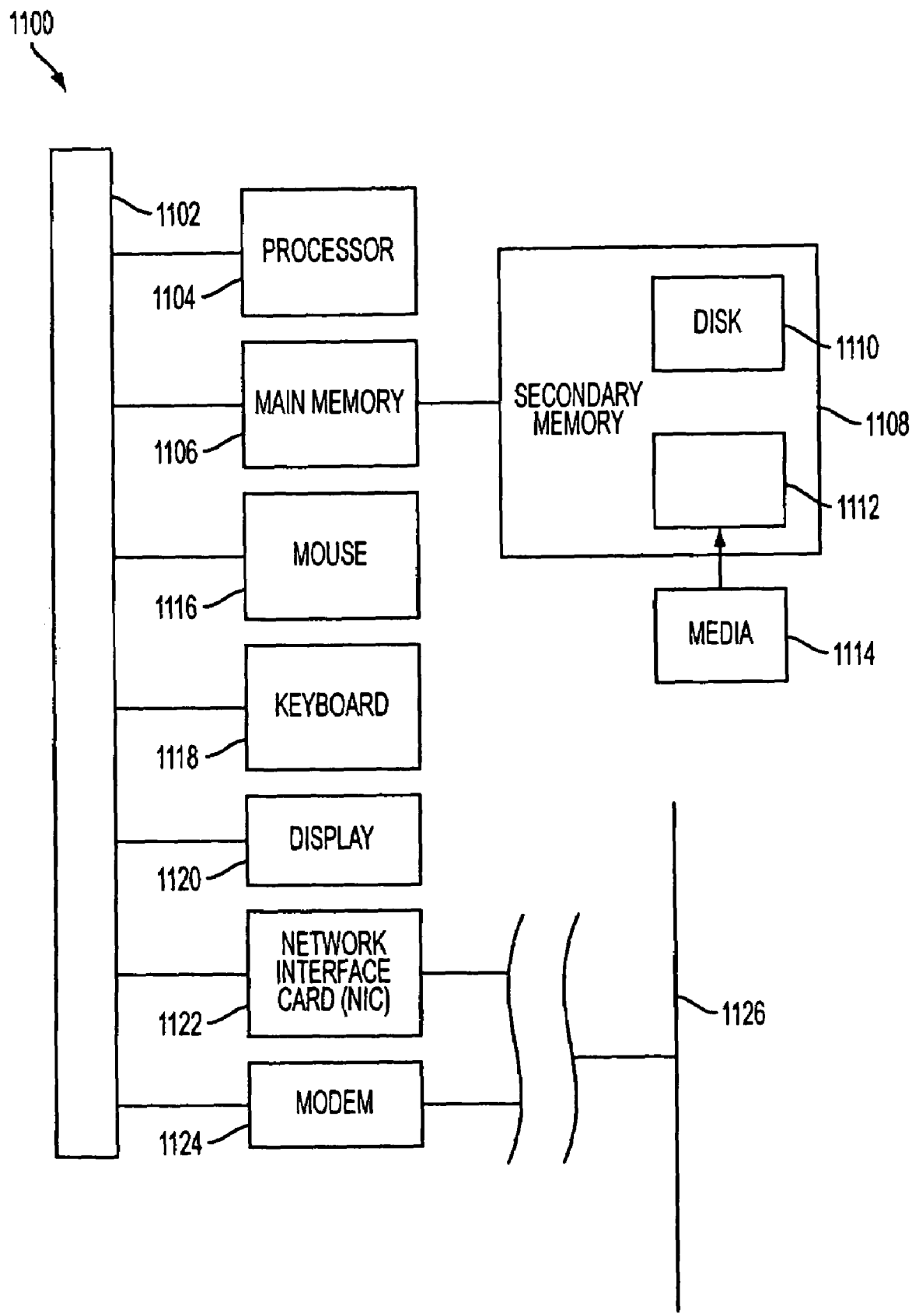
FIG. 11 depicts an exemplary embodiment of a computer and/or communications system as can be used for several components in an exemplary embodiment of the invention.

FIG. 11 depicts an exemplary embodiment of a computer and/or communications system as may be used for several components of the system in an exemplary embodiment of the present invention, such as, for example, the host system. FIG. 11 depicts an exemplary embodiment of a computer 1100 as may be used for several computing devices in exemplary embodiments of the present invention. Computer 1100 may include, but is not limited to: e.g., any computer device, or communications device including, e.g., a personal computer (PC), a workstation, a mobile device, a phone, a handheld PC, a personal digital assistant (PDA), a thin client, a fat client, an network appliance, an Internet browser, a paging, or alert device, a television, an interactive television, a receiver, a tuner, a high definition (HD) television, an HD receiver, a video-on-demand (VOD) system, a server, or other device. Computer 1100, in an exemplary embodiment, may comprise a central processing unit (CPU) or processor 1104, which may be coupled to a bus 1102. Processor 1104 may, e.g., access main memory 1106 via bus 1102. Computer 1100 may be coupled to an Input/Output (I/O) subsystem such as, e.g., a network interface card (NIC) 1122, or a modem 1124 for access to network 1126. Computer 1100 may also be coupled to a secondary memory 1108 directly via bus 1102, or via main memory 1106, for example. Secondary memory 1108 may include, e.g., a disk storage unit 1110 or other storage medium. Exemplary disk storage units 1110 may include, but are not limited to, a magnetic storage device such as, e.g., a hard disk, an optical storage device such as, e.g., a write once read many (WORM) drive, or a compact disc (CD), or a magneto optical device. Another type of secondary memory 1108 may include a removable disk storage device 1112, which can be used in conjunction with a removable storage medium 1114, such as, e.g. a CD-ROM, or a floppy diskette. In general, the disk storage unit 1110 may store an application program for operating the computer system referred to commonly as an operating system. The disk storage unit 1110 may also store documents of a database (not shown). The computer 1100 may interact with the I/O subsystems and disk storage unit 1110 via bus 1102. The bus 1102 may also be coupled to a display 1120 for output, and input devices such as, but not limited to, a keyboard 1118 and a mouse or other pointing/selection device 1116.

The embodiments illustrated and discussed in this specification are intended only to teach those skilled in the art various ways known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A debugging system comprising:
    a host system to observe and control the step-by-step execution of a debugging operation;
    a target system communicatively coupled to the host system, the target system including
    a debug port having a plurality of pins;
    a debug port interface coupled to the debug port; and
    a power management pin separate from said plurality of pins and not coupled to the debug port via the debug port interface; and
    a connection to couple one of said plurality of pins to said power management pin, said connection being independent of said debug port interface.

2. The debugging system of claim 1, wherein the one of said plurality of pins is a general purpose pin and the power management pin is a system sleep pin.

3. The debugging system of claim 1, wherein the one of said plurality of pins is a general purpose pin and the power management pin is a system stopclock pin.

4. The debugging system of claim 1, wherein the one of said plurality of pins is a debug pin and the power management pin is a system error pin.

5. The debugging system of claim 1, wherein the one of said plurality of pins is a debug pin and the power management pin is a system reset pin.

6. The debugging system according to claim 1, wherein the connection is one of blue-wiring, rework, or a post-fabrication board connection.

7. A method of debugging, comprising:
    sampling a power management signal on a device, the power management signal being separate from a test access port of the device;
    determining whether a power management transition has occurred on the based on the power management signal; and
    triggering a debug mode if a power management transition has occurred.

8. The method according to claim 7, wherein the power management signal is a system sleep signal.

9. The method according to claim 7, said determining further comprising:
    determining whether the device has entered a sleep state within which the device is capable of entering a debug mode.

10. A method of debugging, comprising:
    issuing a command to halt execution on a device;
    querying a sleep pin on the device to determine whether the sleep pin is asserted;
    asserting a system error pin on the device to wake up the device;
    querying a stopclock pin on the device to determine whether the sleep pin is de-asserted; and
    processing the halt command.

11. The method according to claim 10, wherein said asserting, querying, and processing are completed only if the sleep pin is asserted.

12. The method according to claim 10, wherein the device comprises a debug port and a debug port interface and the system error pin is not coupled to the debug port via the debug port interface.

13. A method of debugging, comprising:
    deferring power management transitions on a device;
    issuing a test access port scan to the device; and
    determining whether a power management transition occurred during the test access port scan.

14. The method according to claim 13, said deferring comprising:
    clearing a first bit and a second bit in a power management register if power state transitions are not deferred;
    setting the first bit and clearing the second bit if power state transitions are always deferred;
    setting the first bit and clearing the second bit if a target device is in debug mode and power state transitions are deferred while the target device is in debug mode; and
    clearing the first bit and setting the second bit if a target device is not in debug mode and power state transitions are deferred after a breakpoint.

15. The method according to claim 13, further comprising:
    reporting to a user that a power management transition occurred during the test access port scan.

16. A machine accessible medium containing program instructions that, when executed by a processor, cause the processor to:

observe a power management pin assertion on a device, the power management pin assertion being distinct from Joint Test Access Group (JTAG) pin assertions of the device;

determine whether a power state transition has occurred on the device based on the power management pin assertion; and place the device in a debug mode if a power state transition has occurred.

17. The machine accessible medium according to claim 16, wherein the power management pin is a system sleep pin.

18. The machine accessible medium according to claim 16, further comprising instructions that cause the processor to:

determine whether the device has entered a sleep state within which the device is capable of entering the debug mode prior to entering the debug mode.

19. A machine accessible medium containing program instructions that, when executed by a processor, cause the processor to:

issue a command to halt execution of a device;
determine whether a sleep pin of the device is asserted;
assert a system error pin on the device to transition the device to an elevated sleep state;
query a stopclock pin on the device to determine whether the sleep pin is de-asserted; and
process the halt command.

20. The machine accessible medium according to claim 19, further comprising instructions to query a sleep pin on the device to determine whether the sleep pin is asserted.

21. The machine accessible medium according to claim 19, wherein the processor will assert the system error pin, query the stopclock pin, and process the halt command only if the sleep pin is asserted.

22. A machine accessible medium containing program instructions that, when executed by a processor, cause the processor to:

receive a command that indicates to the processor how to defer power state transitions in a target device;

clear a first bit and a second bit in a designated register of a target device if the command indicates that power state transitions are not deferred;

set the first bit and clear the second bit if the command indicates that power state transitions are always deferred;

set the first bit and clear the second bit if the target device is in debug mode and the command indicates that power state transitions are deferred while the target device is in debug mode; and clear the first bit and set the second bit if the target device is not in debug mode and the command indicates that power state transitions are deferred after a breakpoint.

23. The machine accessible medium according to claim 22, further comprising instructions to:

defer power state transitions based on the command;
issue a test access port scan to the target device; and
determine whether a power state transition occurred during the test access port scan.

24. The machine accessible medium according to claim 23, further comprising instructions that cause the processor to:

report to a user that a power state transition occurred during the test access port scan.

* * * * *